United States Patent [19]

Massey et al.

[11] Patent Number: 4,947,334
[45] Date of Patent: Aug. 7, 1990

[54] HELICOPTER CONTROL SYSTEMS

[75] Inventors: Colin P. Massey, Sherborne; David R. Haddon, Bridport, both of England

[73] Assignee: Westland Helicopters Limited, England

[21] Appl. No.: 328,619

[22] Filed: Mar. 27, 1989

[30] Foreign Application Priority Data

Mar. 31, 1988 [GB] United Kingdom ................. 8807676

[51] Int. Cl.⁵ ............................................ G06F 15/16
[52] U.S. Cl. .................................... 364/433; 364/434; 364/431.01; 244/17.13
[58] Field of Search ............... 364/433, 434, 432, 442, 364/431.01, 431.02, 424, 425, 131, 132; 244/17.13, 17.11

[56] References Cited

U.S. PATENT DOCUMENTS

| 4,109,886 | 8/1978 | Tribken et al. | 244/17.13 |
| 4,217,486 | 8/1980 | Tawfik et al. | 364/133 |
| 4,313,201 | 1/1982 | Fischer et al. | 371/68 |
| 4,500,966 | 2/1985 | Zagranski et al. | 364/432 |
| 4,807,129 | 2/1989 | Perks | 244/17.13 |

Primary Examiner—Parshotam S. Lall
Assistant Examiner—Michael Zanelli
Attorney, Agent, or Firm—Larson and Taylor

[57] ABSTRACT

A helicopter control system comprises a flight control computer, an engine control computer and an integrated flight and engine control computer, the latter generating output signals operative both in a flight control system and an engine control system to eliminate or reduce transient variations in the speed of rotation of a main sustaining rotor. The invention can be used with full or limited authority flight control systems.

8 Claims, 2 Drawing Sheets

HELICOPTER CONTROL SYSTEMS

1. Field of the Invention

This invention relates to helicopter control systems and is particularly concerned with flight control systems and engine control systems.

2. Description of the Prior Art

Most modern helicopters incorporate an automatic flight control system (AFCS).

In one such system pilot control inputs are fed directly to main and tail rotor blade pitch change actuators either mechanically, electrically or optically, and signals representative of helicopter flight state information are fed to an on-board flight control computer. The computer generates output signals within a predetermined range in all control axes which are added to the pilot control inputs to the main and tail rotor blade pitch change actuators. Such a flight control system will hereinafter be referred to as a limited authority flight control system.

In another system the on-board flight control computer utilises active control technology (ACT) which receives pilot control input signals and helicopter flight state information and generates output signals which control directly the main and tail rotor blade pitch change actuators throughout their full range. Such a flight control system will hereinafter be referred to as a full authority flight control system.

Conventional engine control systems include an engine control unit which controls the flow of fuel to an engine to maintain the speed of rotation of an output shaft, such as the free turbine shaft of a gas turbine engine, within predetermined limits. The unit receives signals representative of actual output shaft speed and, in some cases, engine output torque, as well as signals representative of various ambient conditions, for computing a fuel flow demand output signal. The engine control unit automatically tries to maintain a constant engine rotational speed about a datum which can be adjusted, within limits, by the pilot.

A problem with existing gas turbine engines is an inability to respond quickly to changes in torque requirements resulting in undesirable transient variations in main rotor rotational speed. This restricts helicopter performance in certain regions of the flight envelope and increases pilot workload due to a need to respect rotor speed limits.

GB A-2185951 discloses a control system for a helicopter comprising an active control computer providing a full authority flight control system, and an engine control computer. The active control computer is linked to exchange data with the engine control computer, and it is suggested that this proposed linking of the computers can avoid excessive transient variations in main rotor rotational speed. The specification however does not adequately disclose how this benefit is achieved since it gives no information as to how appropriate control outputs from the active control computer are derived or how the active control computer and engine control computer are related.

What is clear is that the control system of GB-A-2185951 is intended for use only with full authority active control systems which are not in general use in present day helicopters. Retro-fit in non-ACT helicopters would be a major undertaking and, even for those helicopters with ACT, could present difficulties since the required linking of the active control computer and the engine control computer may require additional computing power as well as adaptation to achieve linking which may dictate replacement of the existing computers. Furthermore in the prior specification, the active control computer demands engine torque directly from the engine control computer whereas, in most existing helicopters engine control is not based around a torque demand and engine torque is not one of the parameters monitored by many existing engine control computers. Even those prior systems which monitor torque do so primarily for engine protection reasons rather than for use in a forward path controller. Usually, a free turbine governing system senses changes in the speed of rotation of the free turbine and responds by changing the fuel flow to the engine to maintain the speed of the free turbine and therefore the rotor. Thus, incorporation of the different philosophy of the disclosure of GB-A-2185451 in existing helicopters may not be easy to accomplish and may necessitate redesign or replacement of the engine control computer.

Furthermore, the prior system considers only the case of a change in rotor speed due to a pilot flight control demand, and no provision is made to change the engine output torque to cater for a change in rotor speed that might result from other causes, for example an operational manoeuvre or an environmental reaction such as a main rotor response to a gust condition.

An objective of the present invention is to provide a practical helicopter control system that solves the problem of reducing undesirable transient variations in main rotor rotational speed while avoiding the inadequacies and disadvantages of the proposals of GB-A-2185951 as above discussed.

SUMMARY OF THE INVENTION

Accordingly, in one aspect this invention provides a helicopter control system comprising an automatic flight control system including a flight control computer, an engine control system including an engine control computer and an integrated flight and engine control computer for receiving output signals from the flight control computer and a signal representative of engine output power for generating output signals operative in both the flight control system and the engine control system.

The generated output signals in the flight control system may comprise signals in all control axes which are summed with pilot control input signals, and the generated output signal in the engine control system may comprise a signal which is summed with a pilot control input signal to the engine control computer.

In another aspect, a helicopter control system comprises an automatic flight control system including a flight control computer, an engine control system including an engine control computer, and pilot control input means providing signals to the flight control computer and the engine control computer whereby the computers generate output signals operative respectively in the flight control system and the engine control system, the control system including an integrated flight and engine control computer receiving said output signals from the flight control computer and a signal representative of engine output power for generating output signals for summing with the pilot control input signals to the flight control computer and an output signal to the engine control computer for controlling engine output power.

In one embodiment, the flight control system is a limited authority flight control system and in an alternative embodiment the flight control system is a full authority flight control system.

In another aspect a helicopter having at least one engine for driving a main sustaining rotor and an anti-torque tail rotor each comprising a plurality of rotor blades includes a flight control system comprising a flight control computer for receiving pilot control input signals and generating output signals for adjusting the pitch of the main and tail rotor blades, an engine control system comprising an engine control computer for generating output signals for controlling the speed of rotation of an engine output shaft, and an integrated flight and engine control computer for predicting the torque required to maintain substantially a datum speed of rotation of the main sustaining rotor and generating an output signal to adjust the speed of rotation of the engine output shaft according to the torque requirement.

Preferably, said integrated flight and engine control computer generates further output signals to adjust the pitch of the rotor blades in the sense to reduce the torque requirement when the predicted torque requirement exceeds the available torque.

The flight control system may comprise a limited authority flight control system.

Alternatively the flight control system may comprise a full authority flight control system.

The integrated flight and engine control computer may include helicopter and engine mathematical models, logic and control laws and differentiator means to obtain rate information for selected input signals.

The integrated flight and engine control computer may receive signals representative of pilot control inputs in the flight and engine control systems, generated output signals from the flight control computer, helicopter flight state information and engine state information.

The pilot control input signals may include signals representative of required main rotor collective, longitudinal and lateral cyclic, and tail rotor collective.

Engine state signals may include a signal representative of output shaft speed and, alternatively, may further include a signal representative of output shaft torque.

Helicopter flight state information may include signals representative of roll, pitch and yaw rate movements and vertical acceleration.

Signals representative of prevailing ambient conditions such as air temperature and pressure may be fed to the engine control computer and the integrated flight and engine control computer.

The invention will now be described by way of example only and with reference to the accompanying drawings in which,

DETAILED DESCRIPTION OF THE DRAWINGS

Figure 1:
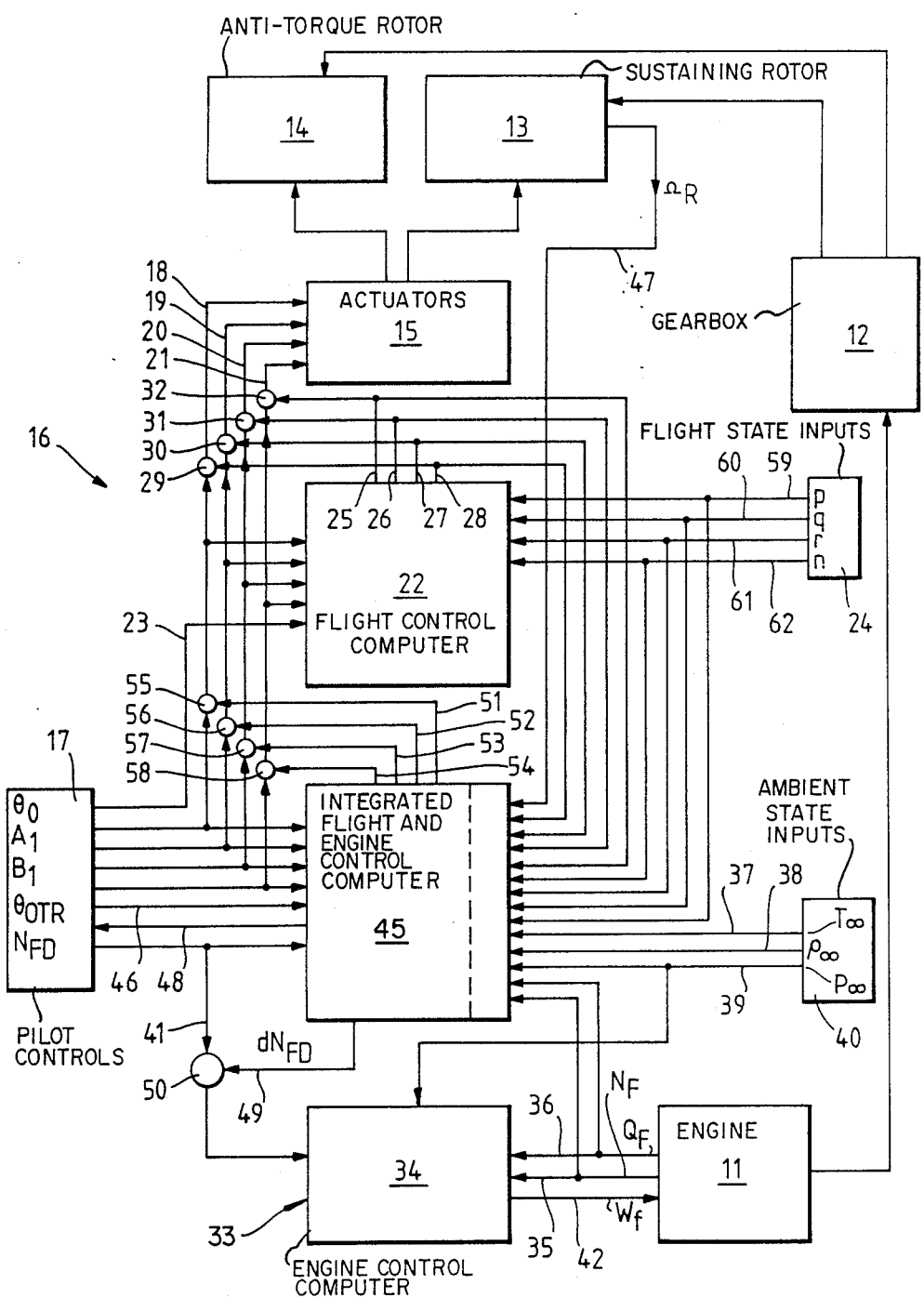
FIG. 1 is a schematic illustration of a helicopter control system constructed according to one embodiment of the invention.

Referring to FIG. 1, a helicopter (not shown) includes at least one gas turbine engine 11 driving a gearbox 12 which in turn drives a main sustaining rotor 13 and an anti-torque tail rotor 14. Each of the rotors 13 and 14 includes a plurality of rotor blades (not shown), the pitch of the blades being adjustable by servo control actuators 15.

A limited authority flight control system 16 includes pilot station 17 for producing pilot control input signals in respect of main rotor collective ($\theta_o$), longitudinal cyclic ($A_1$), lateral cyclic ($B_1$) and anti-torque rotor collective ($\theta_{otr}$). The pilot input signals are transmitted along lines 18, 19, 2'0 and 21, respectively, directly to the respective servo control actuators 15, and it will be understood that lines 18, 19, 20 and 21 may be mechanical, electrical or optical lines.

Status signals from each of the pilot input lines 18, 19, 20 and 21 are fed to a limited authority flight control computer 22 along with signals on line 23 representative of secondary pilot demands e.g. height hold, heading hold etc. Signals representative of helicopter flight states 24 such as roll rate (p), pitch rate (q), yaw rate (r) and vertical acceleration (n) are fed to computer 22 along lines 59, 60, 61 and 62.

The computer 22 generates output signals 25, 26, 27 and 28 which are summed in summing junctions 29, 30, 31 and 32 with the pilot input signals in lines 18, 19, 20 and 21.

An engine control system 33 includes an engine control computer 34 which receives signals from the engine 11 along lines 35 and 36 representative of free turbine shaft speed ($N_F$) and torque ($Q_F$) and signals along line 39 representative of air pressure ($P_{28}$) from ambient condition input 40.

The pilot station 17 includes a pilot control input to the engine control computer 34 along line 41 to enable adjustment of the datum free turbine shaft speed ($N_{FD}$) within restricted limits to allow fine adjustment of the rotational speed of the main sustaining rotor.

Computer 34 generates an output signal ($W_f$) representative of fuel flow demand which is transmitted to the engine along line 42. The line 42 may comprise an electrical signal line or a fuel flow line depending on whether a fuel valve (not shown) is located adjacent the computer 34 or the engine 11.

Figure 2:
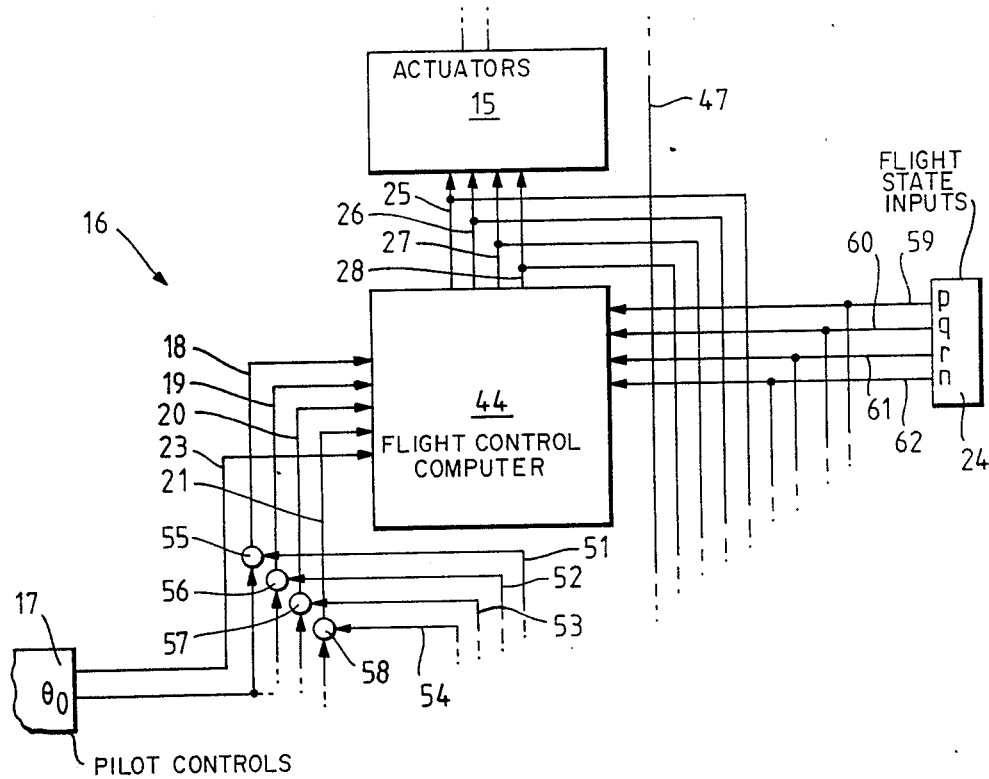
FIG. 2 is a schematic illustration similar to FIG. 1 and constructed according to a further embodiment.

The schematic illustration of FIG. 2 is similar to that previously described and like reference numerals are used to designate similar parts. However, in this embodiment the flight control system 16 comprises a full authority flight control system including an active control computer 44 which is fed directly with electrical or optical signals from pilot station 17 along lines 18, 19, 20 and 21 and signals representative of helicopter flight states 24.

Computer 44 generates output signals in all control axes which are fed along lines 25, 26, 27 and 28 directly to the main and tail rotor blade servo control actuators 15.

Operation of the systems described so far is as follows. In both embodiments the gas turbine engine 11 drives the main sustaining rotor 13 and the anti-torque tail rotor 14 through the gearbox 12. Engine control computer 34 of engine control system 33 is pre-programmed to provide a fuel flow demand signal ($W_f$) in line 42 to control the speed of rotation of the free turbine output shaft of engine 11 to rotate the main sustaining rotor 13 at a predetermined datum rotor speed. Fine tuning of the speed of rotation of the sustaining rotor can be accomplished within restricted limits by an input ($N_{FD}$) from pilots controls 17 which is transmitted along line 41 and sensed by the engine control computer 34 which adjusts accordingly the fuel flow demand signal ($W_f$) in line 42.

In the limited authority flight control system 16 of FIG. 1, pilot control signals in lines 18, 19, 20 and 21 are fed directly to the main and tail rotor blade pitch control servos 15 to change the pitch of the respective rotor blades according to commands from the pilot station 17. Status signals representative of these primary pilot control signals are fed to computer 22 along with secondary pilot demands comprising signals representative of desired height hold, heading hold etc., along line 23, and the computer 22 uses this information together with helicopter flight state information 24 to generate output signals in lines 25, 26, 27 and 28 in all control axes which are summed with the pilot input signals in summing junctions 29, 30, 31 and 32 so as to stabilise the flight of the helicopter and provide automatic control functions.

For both aerodynamic and dynamic considerations, an important design feature in helicopter flight control is to maintain the datum speed of rotation of the main sustaining rotor, and in the described helicopter, which utilises a free turbine turboshaft engine, this is achieved by controlling the speed of rotation of the free turbine shaft. Thus any tendency for the speed of rotation of the main sustaining rotor to move away from the datum speed is sensed by the engine control computer 34 which adjusts the fuel flow demand signal ($W_f$) in line 42 accordingly.

Since power is not instantly available from a turboshaft engine there is a time lag between a change in rotor speed and the effect of corrective action by the fuel control system 33, and this is detrimental to helicopter performance especially in respect of rotor speed decay caused, say, by an increase in selected blade pitch angle.

In the full authority control system illustrated in FIG. 2, the direct coupling of the pilots control inputs to the main and tail servo actuators 15 is replaced entirely by the generated output signals 25, 26, 27 and 28 from the active control computer 44. The computer 44 functions in the flight control system 16 only and whilst it is capable within that system of sensing the pilots demands and computing the best way of meeting those demands within the constraints of the helicopter flight state information, the aforementioned problems concerning control of main rotor rotational speed remain.

It will be understood that the limited authority flight control system of FIG. 1 and the full authority flight control system of FIG. 2 as well as the engine control system 33 that is common to both embodiments are known in the art and form no part of the present invention.

Reverting now to FIG. 1, the helicopter of this invention includes an integrated flight and engine control computer 45 which receives the aforementioned signals from pilot station 17 as well as further pilot control input signals along line 46. Helicopter flight state signals 24 on lines 59, 60, 61 and 62 and signals along lines 37, 38 and 39 representative of air temperature ($T_{28}$), air density ($\rho_\infty$) and air pressure ($p_\infty$) of ambient condition signals 40 are fed to computer 45 along with signals from the engine 11 representative of free turbine shaft speed ($N_F$) and torque ($Q_F$).

Additionally, the output signals in lines 25, 26, 27 and 28 generated in the flight control computer 22 (FIG. 1) or 44 (FIG. 2) are fed to the computer 45 as well as a signal on line 47 from main sustaining rotor 13 representative of main sustaining rotor rotational speed ($\Omega r$).

Status signals providing information concerning the operation of the integrated flight and engine control computer are fed to the pilot station 17 through line 48.

Integrated flight and engine control computer 45 includes aircraft and engine mathematical models, logic, control laws and a differentiator to obtain rate information for selected inputs.

In operation of this invention in respect of the embodiments of both FIGS. 1 and 2, the computer 45 utilises the various input signals to predict the torque and rate of change of torque that will be required to maintain the required datum speed of rotation of the main sustaining rotor 13 at any point within the helicopter flight envelope, and generates a demand signal ($dN_{FD}$) in line 49 that is summed in summing junction 50 in line 41 to adjust the datum free turbine speed and hence change the fuel flow demand signal ($W_f$) in line 42 to attempt to meet the predicted torque requirement.

The computer 45 also generates signals in lines 51, 52, 53 and 54 which are summed in summing junctions 55, 56, 57 and 58 with pilot control input signals in lines 18, 19, 20 and 21 to adjust the pitch of the rotor blades. This ensures firstly that if the engine 11 cannot respond quickly enough to produce the required torque to meet the predicted demand, the relevant pilot input signal is reduced accordingly until the requirement can be achieved.

Secondly, if the pilot input signals are such as to generate a manoeuvre in which the predicted torque demand is greater than the predicted torque available the computer 45 generates output signals in lines 51, 52, 53 and 54 to reduce the input demands accordingly.

In this respect it is to be noted that pilot input on line 46 can include a signal to adjust the control modes for operation of the helicopter in different roles.

The predictive capability of this invention results from the use of helicopter and engine mathematical models in the integrated flight and engine control computer 45, and the provision of input signals relating to helicopter flight state information extends the predictive capability to anticipate changes in the rotational speed of the main rotor due to factors other than those directly attributable to a pilot input signal, e.g. a manoeuvre condition or gust response.

Thus, this invention increases helicopter performance by reducing or eliminating transient variations of rotor speed, and this efficient control of rotor speed improves helicopter stability. Furthermore pilot workload is reduced, an element of carefree handling is introduced, and safety is improved for example by the ability to make rapid corrective actions in the event of engine power loss. The optimised control of datum rotor speed by this invention may also improve fuel efficiency.

Other important features of the invention are that it can be retro-fitted to existing full or limited authority helicopter control systems and use of the integrated flight and engine control computer 45 means that changes to existing flight control computers and engine control computers are minimised and additional computing power is not required in the existing computers. The use in the described embodiments of the control of free turbine shaft speed to control engine output power is also compatible with most existing helicopters so that existing rotor speed datum control systems can be retained.

Whilst two embodiments of the invention have been described and illustrated it will be understood that many modifications may be made without departing from the scope of the invention as defined in the appended claims. For example, the integrated flight and engine control computer 45 can be adapted to control engine fuel flow by any suitable means other than the control of the $N_F$ datum signal of the illustrated embodiment. Further performance benefits can be incorporated for example by allowing energy to be selectively absorbed or released by increasing or decreasing main rotor rotational speed in a controlled manner, and may further provide for automatic entry into autorotation and an automatic recovery from a failure of the anti-torque rotor or its drive means.

What is claimed is:

1. A helicopter having at least one engine for driving a main sustaining rotor and an anti-torque tail rotor each comprising a plurality of rotor blades, a flight control system comprising a flight control computer for receiving pilot flight control input signals and generating output signals for adjusting the pitch of the main and tail rotor blades, an engine control computer for receiving a pilot engine control input signal and generating output signals for controlling the speed of rotation of an engine output shaft, and an integrated flight and engine control computer receiving said output signals from the flight control computer, a signal representative of engine state information and signals representative of helicopter flight state information, said integrated flight and engine control computer including helicopter and engine mathematical models for predicting the torque required from the engine to maintain substantially a constant datum speed of rotation of the main sustaining rotor and generating output signals for summing with the pilot engine control input signal to the engine output shaft to meet the predicted torque requirement and for summing with the pilot flight control input signals to the flight control computer to adjust said signals if the engine cannot respond quickly to meet the predicted torque demand or the predicted torque demand is greater than that available.

2. A helicopter as claimed in claim 1, wherein the flight control system comprises a limited authority flight control system.

3. A helicopter as claimed in claim 1, wherein the flight control system comprises a full authority flight control system.

4. A helicopter as claimed in claim 1, wherein said pilot control input signals include signal representative of required main rotor collective, longitudinal and lateral cyclic and tail rotor collective.

5. A helicopter as claimed in claim 1, wherein said engine state information includes signals representative of output shaft speed.

6. A helicopter as claimed in claim 1, wherein said engine state information includes signals representative of output shaft speed and output shaft torque.

7. A helicopter as claimed in claim 1, wherein said helicopter flight state information includes signals representative of roll, pitch and yaw rate movements and vertical acceleration.

8. A helicopter as claimed in claim 1, wherein signals representative of prevailing ambient conditions are fed to the engine control computer and the integrated flight and engine control computer.

* * * * *